(12) United States Patent
Leigh et al.

(10) Patent No.: US 10,495,826 B2
(45) Date of Patent: Dec. 3, 2019

(54) RECEPTACLE FOR CONNECTING A MULTI-LANE OR ONE-LANE CABLE

(71) Applicant: HEWLETT PACKARD ENTERPRISE DEVELOPMENT LP, Houston, TX (US)

(72) Inventors: Kevin B Leigh, Montgomery, TX (US); John Norton, Houston, TX (US); George D Megason, Sr., Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/500,058

(22) PCT Filed: Sep. 26, 2014

(86) PCT No.: PCT/US2014/057856
§ 371 (c)(1),
(2) Date: Jan. 28, 2017

(87) PCT Pub. No.: WO2016/048373
PCT Pub. Date: Mar. 31, 2016

(65) Prior Publication Data
US 2017/0269308 A1 Sep. 21, 2017

(51) Int. Cl.
G02B 6/38 (2006.01)
G02B 6/44 (2006.01)
H04B 10/25 (2013.01)
H04Q 11/00 (2006.01)

(52) U.S. Cl.
CPC ......... *G02B 6/3879* (2013.01); *G02B 6/3893* (2013.01); *G02B 6/3895* (2013.01); *G02B 6/4452* (2013.01); *H04B 10/25* (2013.01); *H04Q 11/0005* (2013.01); *H04Q 2011/0007* (2013.01)

(58) Field of Classification Search
CPC ... G02B 6/3879; G02B 6/3895; G02B 6/3893
See application file for complete search history.

(56) References Cited

U.S. PATENT DOCUMENTS

| 6,259,856 B1 * | 7/2001 | Shahid ................. G02B 6/3879 385/147 |
| 7,840,714 B2 | 11/2010 | Downing |
| 7,991,293 B2 | 8/2011 | Chandra |
| 8,388,235 B1 | 3/2013 | Volker |
| 2004/0228627 A1 | 11/2004 | Alana |

(Continued)

FOREIGN PATENT DOCUMENTS

| CN | 101356464 | 1/2009 |
| TW | M469618 | 1/2014 |

OTHER PUBLICATIONS

"Scalable PCI Express Switch Family," Feb. 20, 2008, http://www.dataweek.co.za/news.aspx?pklnewsid=28031.

*Primary Examiner* — Ryan A Lepisto
(74) *Attorney, Agent, or Firm* — Dicke, Billig & Czaja, PLLC

(57) ABSTRACT

One example of a system includes a receptacle including a plurality of bays. Each bay of the receptacle supports 1-lane of network communications. The receptacle is to connect to a multi-lane optical cable to provide a multi-lane port or connect to a plurality of 1-lane optical cables to provide a plurality of 1-lane ports.

17 Claims, 9 Drawing Sheets

(56) References Cited

U.S. PATENT DOCUMENTS

| | | |
|---|---|---|
| 2007/0116411 A1 | 5/2007 | Benton |
| 2008/0044141 A1 | 2/2008 | Willis |
| 2011/0116748 A1* | 5/2011 | Smrha .................. G02B 6/3825 385/76 |
| 2011/0262077 A1* | 10/2011 | Anderson ............ G02B 6/3825 385/78 |
| 2013/0323940 A1* | 12/2013 | Coffey .................... G02B 6/36 439/38 |
| 2013/0346653 A1 | 12/2013 | Freking et al. |
| 2014/0161397 A1* | 6/2014 | Gallegos .............. G02B 6/3879 385/89 |
| 2014/0205243 A1 | 7/2014 | Baker |

* cited by examiner

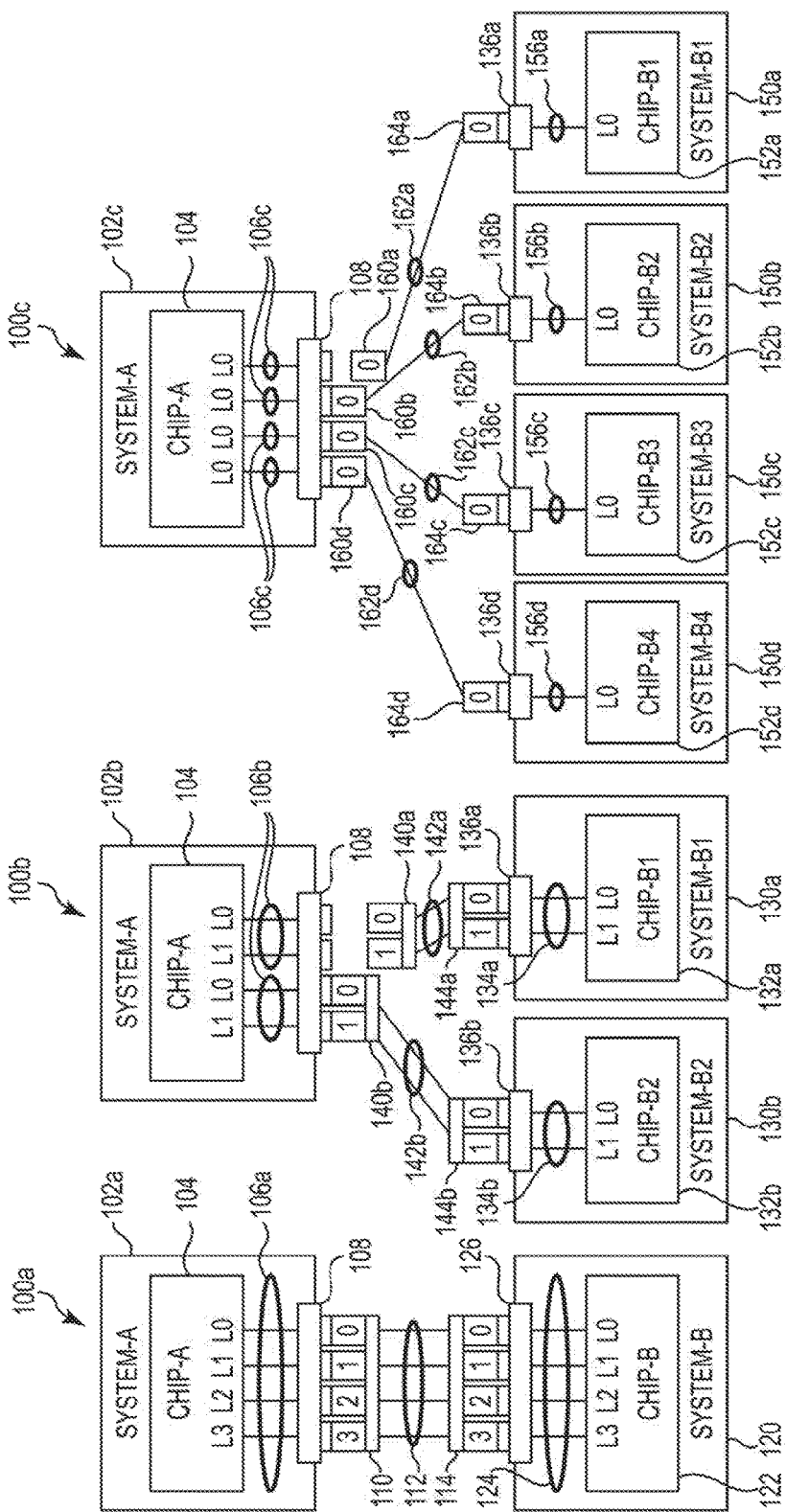

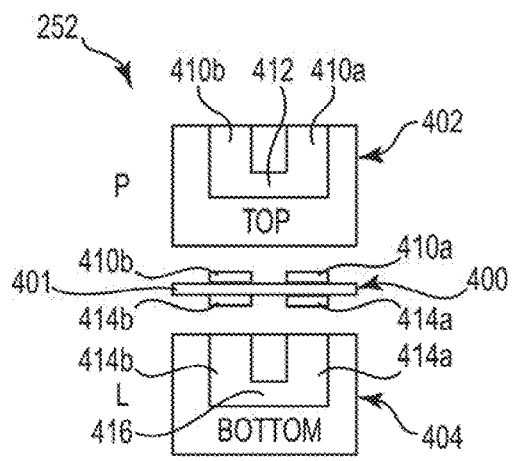
Fig. 6
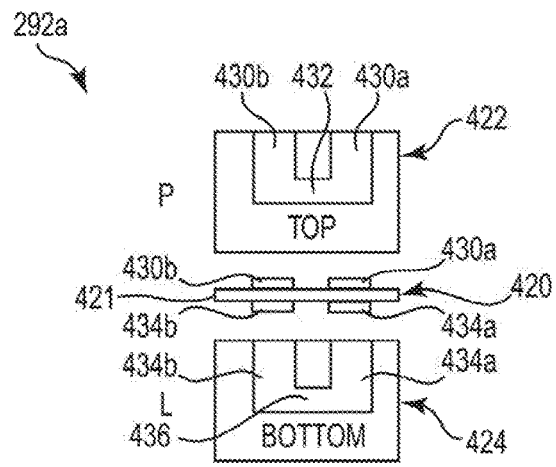
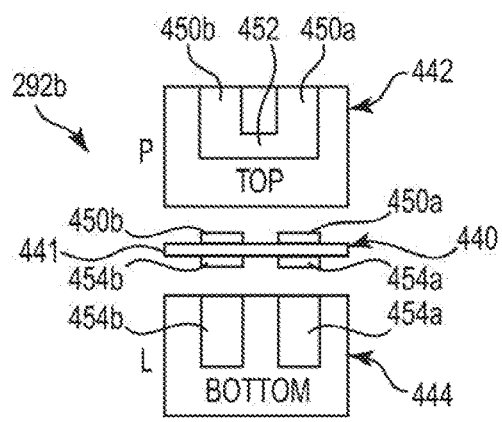
Fig. 7

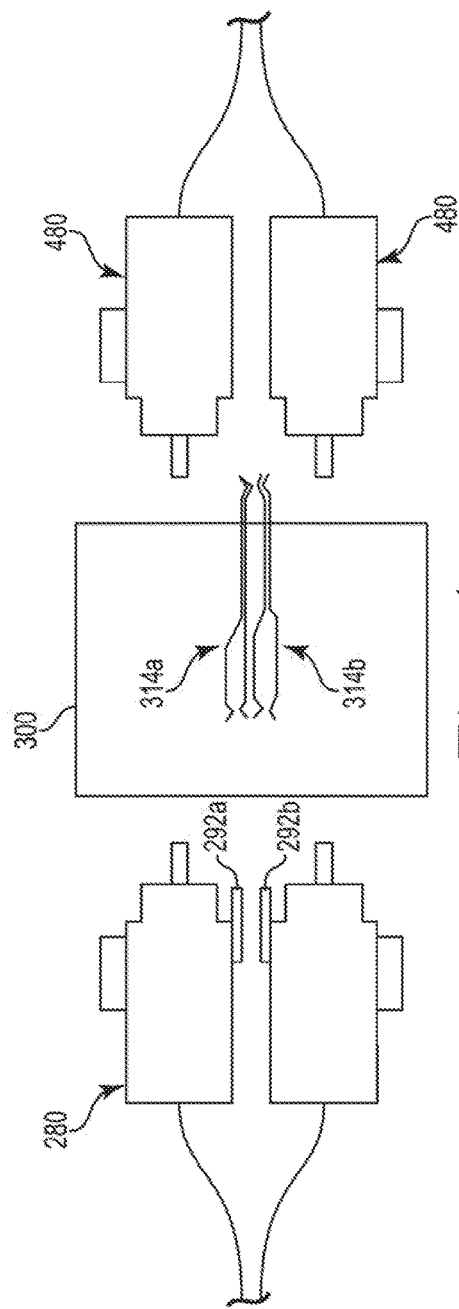
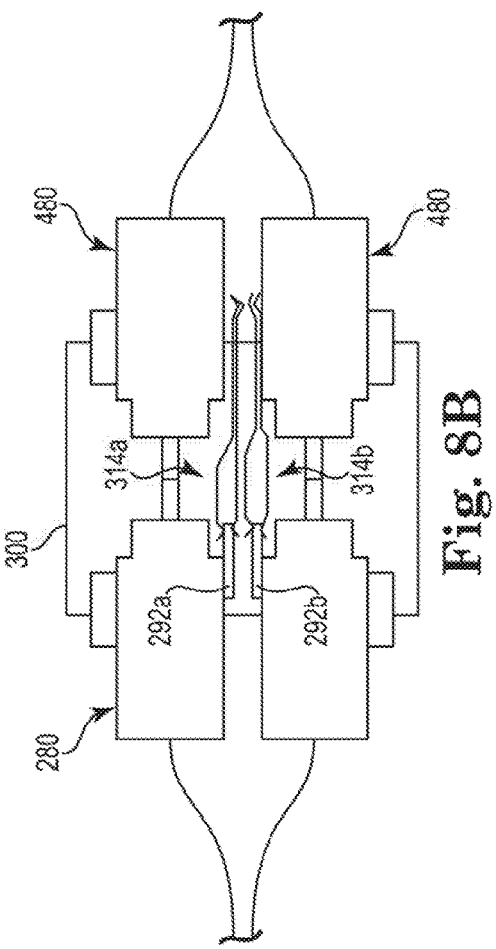

RECEPTACLE FOR CONNECTING A MULTI-LANE OR ONE-LANE CABLE

BACKGROUND

High-radix network switch modules may support a high number of connectors on their faceplates. Network port standards allow 1-lane and wider ports (e.g., 12-lane for CXP), and wider ports use larger connectors and thus fewer connectors on the faceplate. Different applications use different port bandwidth. Traditionally, either 1-lane (e.g., Small Form-Factor Pluggable (SFP)) or 4-lane (e.g., Quad Small Form-Factor Pluggable (QSFP)) ports predominate the Ethernet industry. As the bandwidth per lane has reached 10 Gbps, however, not every system can take advantage of QSFP 4-lane ports,

BRIEF DESCRIPTION OF THE DRAWINGS

FIGS. 1A-1C illustrate examples of systems including modularly scalable connectors and cables.

FIG. 6 illustrates one example of Present (P) and Low-lane (L) signal detect pins for a 2-lane optical cable connector.

FIG. 7 illustrates one example of P and L signal detect pins for a 4-lane optical cable connector.

FIG. 8A illustrates a side view of one example of an uninstalled 4-lane optical cable and FIG. 8B illustrates a side view of one example of an installed 4-lane optical cable.

DETAILED DESCRIPTION

Figure 2A:
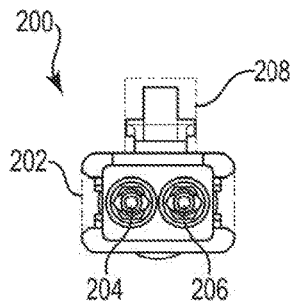
FIG. 2A illustrates one example of a 1-lane optical cable and FIG. 2B illustrates one example of a 1-lane optical cable receptacle.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Traditional network ports have a fixed number of lanes. A lane includes a transmit signal and a receive signal for network communications. For example, 1 GbE and 10 GbE can be 1-lane, 10 GbE, 40 GbE, and 100 GbE may be 4-lane, and 100GbE may be 10-lane. Accordingly, network chips, connectors, and cables have been defined to provide a fixed number of lanes for a network port. Ethernet standards have been emerging where a port of a network chip may be configured to be a 4-lane port (e.g., 4×25 G for 100 GbE), a 2-lane port (e.g., 2×25 G for 50 GbE), or a 1-lane port (e.g., 1×25 G for 25 GbE). Existing connectors and cables for network ports are defined for a fixed number of lanes. This is not a problem for 1-lane ports or for multi-lane ports as long as the application calls for fixed lane-count ports (e.g., QSFP for a 4-lane port). When a multi-lane port of a chip in a network switch system, however, needs to be connected by network interface chips in computer systems having a varying number of lanes (e.g., 1-lane, 2-lane, 4-lane), the fixed lane-count connectors and cables will force certain lanes on a network chip port to be unusable, thus resulting in wasted or stranded lanes. A network chip may be a switch ASIC, a NIC (network interface controller) chip, an electrical transceiver chip (e.g., retimer, redriver), an optical transceiver chip, or a combination of these chips interconnected.

To minimize product models, many switches include QSFP ports. Using only one lane or two lanes out of the available four lanes, however, is wasteful. Therefore, users may buy switches with QSFP 4-lane ports for future proofing, and use break-out cables to fan-out four SFP 1-lane ports or two 2-lane ports for every QSFP port or for every two QSFP ports, respectively. This approach is expensive and can introduce signal integrity and connection reliability issues. Accordingly, this disclosure describes receptacles and cable connectors to allow receptacles on the system side to accept different lane-count cables so that switch manufacturers can design one system with one set of connectors on each faceplate that will allow varying lane-count cables Switch port signals may be connected to specific receptacle connector bays in a way that all the lanes of the network chips can be used regardless of the cable type installed. Therefore, the disclosure provides for high connector density and lower solution costs by enabling simple and compact connector designs. In addition, detect contacts may be provided in the connectors for dynamic detection of the cable types so that system management logic can appropriately configure the network switch chips and/or transceiver chips to support the cables installed.

Each network port connection is provided on a switch in the form of a receptacle for an external cable to be connected. Although the receptacles may be implemented on the front or the rear side of a switch, this disclosure uses the term "faceplate" to generically describe where the receptacles are located for cables to be installed.

FIGS. 1A-1C illustrate examples of systems including modularly scalable connectors and cables. FIG. 1A illustrates one example of a system 100a. System 100a includes a system-A 102a and a system-B 120. System-A 102a includes a network chip-A 104 communicatively coupled to a receptacle 108 via a 4-lane port 106a. System-B 120 includes a network chip-B 122 communicatively coupled to a receptacle 126 via a 4-lane port 124. A cable 112 having a first 4-lane cable connector 110 at one end of the cable and a second 4-lane cable connector 114 at the other end of the cable communicatively couples system-A 102a to system-B 120. First 4-lane cable connector 110 is connected to receptacle 108, and second 4-lane cable connector 114 is connected to receptacle 126. In this example, both system-A 102a and system-B 120 use a 4-lane receptacle and network chip-A 104 and network chip-B 122 are configured for 4-lanes L0, L1, L2, and L3.

FIG. 1B illustrates one example of a system 100b. System 100b includes a system-A 102b, a system-B1 130a, and a system-62 130b. System-A 102b includes a network chip-A 104 communicatively coupled to a receptacle 108 via two 2-lane ports 106b. System-B1 130a includes a network chip-B1 132a communicatively coupled to a receptacle 136a via a 2-lane port 134a, A cable 142a having a first 2-lane cable connector 140a at one end of the cable and a second 2-lane cable connector 144a at the other end of the cable may communicatively couple (shown disconnected in FIG. 16) system-A 102b to system-B1 130. First 2-lane cable connector 140a may be connected to receptacle 108, and second 2-lane cable connector 144a is connected to receptacle 136a.

System-B2 130b includes a network chip-B2 132b communicatively coupled to a receptacle 136b via a 2-lane port 134b. A cable 142b having a first 2-lane cable connector 140b at one end of the cable and a second 2-lane cable connector 144b at the other end of the cable communicatively couples system-A 102b to system-B2 130b. First 2-lane cable connector 140b is connected to receptacle 108, and second 2-lane cable connector 144b is connected to receptacle 136b. In this example, while system-A 102b uses a 4-lane receptacle, system-B1 130a and system-B2 130b use 2-lane receptacles. Network chip-A 104 is configured for a pair of 2-lanes L0, L1, and network chip-B1 132a and network chip-B2 132b are each configured for a corresponding 2-lanes L0, L1.

FIG. 1C illustrates one example of a system 100c. System 100c includes a system-A 102c, a system-B1 150a, a system-B2 150b, a system-B3 150c, and a system-B4 150d. System-A 102c includes a network chip-A 104 communicatively coupled to a receptacle 108 via four 1-lane ports 106c. System-B1 150a includes a network chip-B1 152a communicatively coupled to a receptacle 156a via a 1-lane port 154a. A cable 162a having a first 1-lane cable connector 160a at one end of the cable and a second 1-lane cable connector 164a at the other end of the cable may communicatively couple (shown disconnected in FIG. 1C) system-A 102c to system-B1 150a. First 1-lane cable connector 160a may be connected to receptacle 108, and second 1-lane cable connector 164a may be connected to receptacle 156a.

System-B2 150b includes a network chip-B2 152b communicatively coupled to a receptacle 156b via a 1-lane port 154b. A cable 162b having a first 1-lane cable connector 160b at one end of the cable and a second 1-lane cable connector 164b at the other end of the cable communicatively couples system-A 102c to system-B2 150b. First 1-lane cable connector 160b is connected to receptacle 108, and second 1-lane cable connector 164b is connected to receptacle 156b.

System-B3 150c includes a network chip-B3 152c communicatively coupled to a receptacle 156c via a 1-lane port 154c. A cable 162c having a first 1-lane cable connector 160c at one end of the cable and a second 1-lane cable connector 164c at the other end of the cable communicatively couples system-A 102c to system-B3 150c. First 1-lane cable connector 160c is connected to receptacle 108, and second 1-lane cable connector 164c is connected to receptacle 156c.

System-B4 150d includes a network chip-B4 152d communicatively coupled to a receptacle 156d via a 1-lane port 154d. A cable 162d having a first 1-lane cable connector 160d at one end of the cable and a second 1-lane cable connector 164d at the other end of the cable communicatively couples system-A 102c to system-B4 150d. First 1-lane cable connector 160d is connected to receptacle 108, and second 1-lane cable connector 164d is connected to receptacle 156d. In this example, while system-A 102c uses a 4-lane receptacle, system-B1 150a, system-B2 150b, system-B3 150c, and system-B4 150d each use a 1-lane receptacle. Network chip-A 104 is configured for four 1-lanes L0 and network chip-B1 152a, network chip-B2 152b, network chip-B3 152c, and network chip-B4 152d are each configured for a corresponding 1-lane L0.

In systems 100a-100c, the network chip-A ports and cable signal paths are fully utilized so there are no stranded lanes. Each cable is independently connecting the corresponding ports on system-A and system-B so there is no single point-of-failure. Each cable is directly coupled between a system-A port and a system-B port such that no additional connectors or cable stages are used, thereby improving signal integrity, improving connection reliability, and reducing cost. In addition, the 4-lane system receptacle may be more compact than four independent 1-lane receptacles. System-A, which is the same in systems 100a-100c, has receptacle 108 to enable coupling to system-B1, system-B2, system-B3, and system-B4, which have network chips having different lane-counts, by using appropriate lane-count cables, thereby reducing the system-A development cost. Without receptacle 108 and configurable network chip-A 104, different system-A designs would be needed to support varying number of lane count receptacles to avoid stranded ports.

Figure 2B:
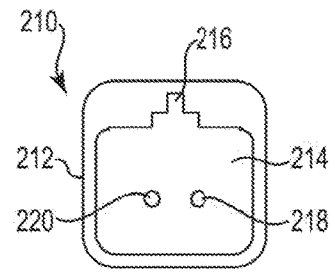

FIG. 2A illustrates one example of a 1-lane optical cable 200 and FIG. 2B illustrates one example of a 1-lane optical cable receptacle 210. As used herein, the term "cable" includes the cable connector. Optical cable 200, as illustrated in FIG. 2A, includes a housing 202 providing a cable connector, a latch 208, a transmit optical fiber or lens 204, and a receive optical fiber or lens 206. Latch 208 is attached to housing 202. Latch 208 ensures positive retention of optical cable 200 in an optical cable receptacle when the optical cable is installed, and allows easy removal of the optical cable from the optical cable receptacle. Housing 202 defines a lane-0 connector finger including transmit optical fiber or lens 204 and receive optical fiber or lens 206 for transmitting and receiving lane-0 optical signals across the optical cable.

Optical cable receptacle 210, as illustrated in FIG. 2B, includes a housing 212, a first optical fiber or lens 218, and a second optical fiber or lens 220. Housing 212 includes a latch area 216 to receive latch 208 when optical cable 200 is installed in 1-lane optical cable receptacle 210. Housing 212 defines a bay 214 (i.e., bay-1) to receive housing 202 when optical cable 200 is installed in 1-lane optical cable receptacle 210. First optical fiber or lens 218 is optically coupled to transmit optical fiber or lens 204 and second optical fiber or lens 220 is optically coupled to receive optical fiber or lens 206 when optical cable 200 is installed in 1-lane optical cable receptacle 210.

Figure 3A:
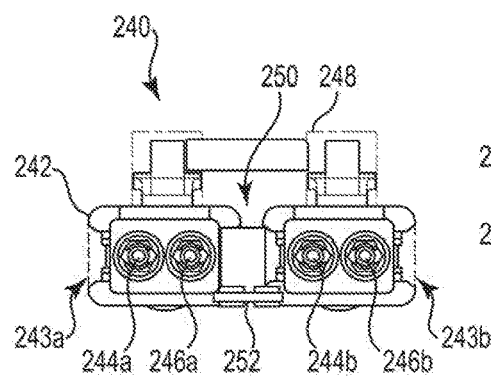
FIG. 3A illustrates one example of a 2-lane optical cable and FIG. 3B illustrates one example of a 2-lane optical cable receptacle.
Figure 3B:
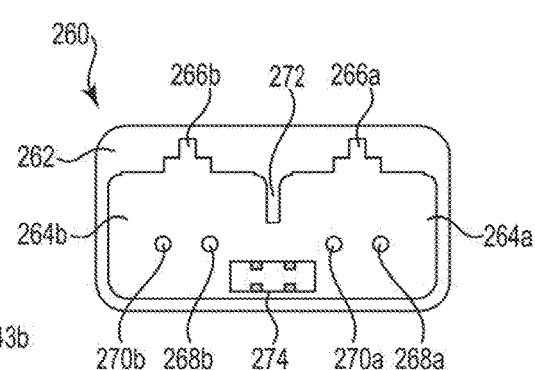

FIG. 3A illustrates one example of a 2-lane optical cable 240 and FIG. 3B illustrates one example of a 2-lane optical cable receptacle 260. Optical cable 240, as illustrated in FIG.

3A, includes a housing 242 providing a cable connector, a latch 248, transmit optical fibers or lenses 244a-244b, receive optical fibers or lenses 246a-246b, and Present (P) and Low-lane (L) signal detect pins 252. Latch 248 is attached to housing 242 and includes two levers that are linked to each other such that one motion will actuate both levers. Latch 248 ensures positive retention of optical cable 240 in an optical cable receptacle when the cable is installed, and allows easy removal of the optical cable from the optical cable receptacle.

Housing 242 defines a lane-0 connector finger 243a and a lane-1 connector finger 243b separated by a vertical notch 250. Lane-0 connector finger 243a includes transmit optical fiber or lens 244a and receive optical fiber or lens 246a for transmitting and receiving lane-0 optical signals across the optical cable. Lane-1 connector finger 243b includes transmit optical fiber or lens 244b and receive optical fiber or lens 246b for transmitting and receiving lane-1 optical signals across the optical cable.

P and L signal detect pins 252 are used to identify to a system in which optical cable 240 is installed that optical cable 240 is a 2-lane optical cable. P and L signal detect pins 252 will be further described below with reference to FIG. 6.

Optical cable receptacle 260, as illustrated in FIG. 3B, includes a housing 262, a P and L signal detect pins receptacle 274, first optical fibers or lenses 268a-268b, and second optical fibers or lenses 270a-270b. Housing 262 includes latch areas 266a-266b to receive latch 248 when optical cable 240 is installed in 2-lane optical cable receptacle 260. Housing 262 defines a first bay 264a (i.e., bay-1) and a second bay 264b (i.e., bay-2) separated by a divider wall 272. Bay-1 264a receives finger 243a and bay-2 264b receives finger 243b when optical cable 240 is installed in 2-lane optical cable receptacle 260. First optical fibers or lenses 268a-268b are optically coupled to transmit optical fibers or lenses 244a-244b, respectively, and second optical fibers or lenses 270a-270b are optically coupled to receive optical fibers or lenses 246a-246b, respectively, when optical cable 240 is installed in 2-lane optical cable receptacle 260.

P and L signal detect pins receptacle 274 extends between bay-1 264a and bay-2 264b. P and L signal detect pins receptacle 274 receives P and L signal detect pins 252 of optical cable 240 when optical cable 240 is installed in 2-lane optical cable receptacle 260. P and L signal detect pins receptacle 274 includes contacts to electrically contact P and L signal detect pins 252 when optical cable 240 is installed.

Figure 4A:
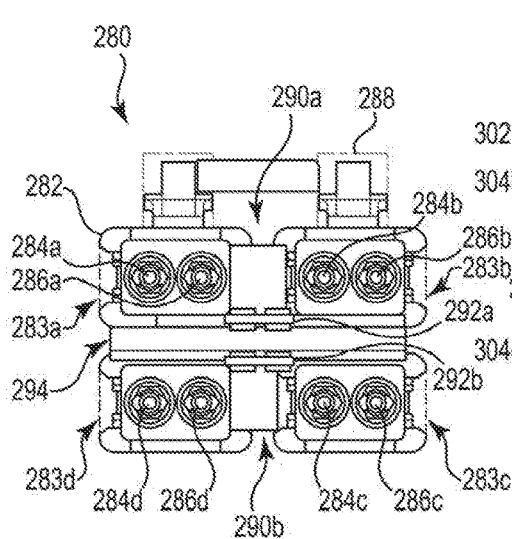
FIG. 4A illustrates one example of a 4-lane optical cable and FIG. 4B illustrates one example of a 4-lane optical cable receptacle.
Figure 4B:
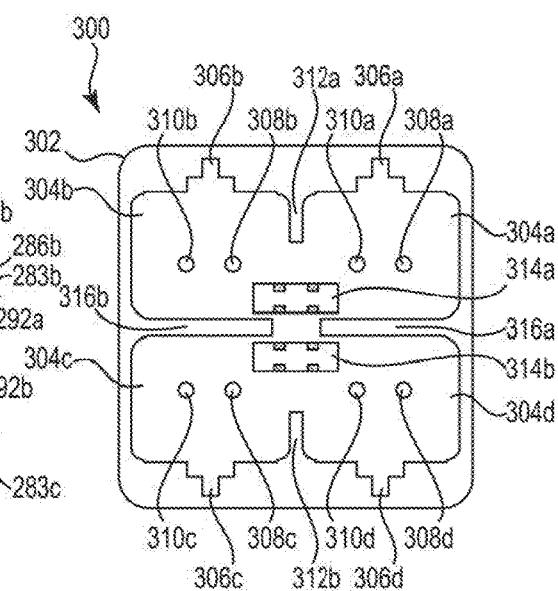

FIG. 4A illustrates one example of a 4-lane optical cable 280 and FIG. 4B illustrates one example of a 4-lane optical cable receptacle 300. Optical cable 280, as illustrated in FIG. 4A, includes a housing 282 providing a cable connector, a latch 288, transmit optical fibers or lenses 284a-284d, receive optical fibers or lenses 286a-286d, and P and L signal detect pins 292a-292b. Latch 288 is attached to housing 282 and includes two levers that are linked to each other such that one motion will actuate both levers. Latch 288 ensures positive retention of optical cable 280 in an optical cable receptacle when the cable is installed, and allows easy removal of the optical cable from the optical cable receptacle. In another example, another latch is attached to the bottom of housing 282 opposite latch 288.

Housing 282 defines a lane-0 connector finger 283a, a lane-1 connector finger 283b, a lane-3 connector finger 283c, and a lane-4 connector finger 283d. Lane-0 connector finger 283a and lane-1 connector finger 283b are separated by a top vertical notch 290a. Lane-3 connector finger 283c and lane-4 connector finger 283d are separated by a bottom vertical notch 290b. Lane-0 connector finger 283a and lane-1 connector finger 283b are separated from lane-3 connector finger 283c and lane-4 connector finger 283d by a horizontal notch 294.

Lane-0 connector finger 283a includes transmit optical fiber or lens 284a and receive optical fiber or lens 286a for transmitting and receiving lane-0 optical signals across the optical cable. Lane-1 connector finger 283b includes transmit optical fiber or lens 284b and receive optical fiber or lens 286b for transmitting and receiving lane-1 optical signals across the optical cable. Lane-3 connector finger 283c includes transmit optical fiber or lens 284c and receive optical fiber or lens 286c for transmitting and receiving lane-3 optical signals across the optical cable. Lane-4 connector finger 283d includes transmit optical fiber or lens 284d and receive optical fiber or lens 286d for transmitting and receiving lane-4 optical signals across the optical cable.

P and L signal detect pins 292a-292b are used to identify to a system in which optical cable 280 is installed that optical cable 280 is a 4-lane optical cable. P and L signal detect pins 292a-292b will be further described below with reference to FIG. 7.

Optical cable receptacle 300, as illustrated in FIG. 4B, includes a housing 302, P and L signal detect pins receptacles 314a-314b, first optical fibers or lenses 308a-308d, and second optical fibers or lenses 310a-310d. Housing 302 includes latch areas 306a-306d to receive a latch when an optical cable is installed in 4-lane optical cable receptacle 300. Housing 302 defines a first bay 304a (i.e., bay-1), a second bay 304b (i.e., bay-2), a third bay 304c (i.e., bay-3), and a fourth bay 304d (i.e., bay-4). Bay-1 304a is separated from bay-2 304b by a vertical divider wall 312a, and bay-3 304c is separated from bay-4 304d by a vertical divider wall 312b. Bay-1 304a is separated from Bay-4 304d by a horizontal divider wall 316a, and bay-2 304b is separated from Bay-3 304c by a horizontal divider wall 316b.

Bay-1 304a receives finger 283a, bay-2 304b receives finger 283b, bay-3 304c receives finger 283c, and bay-4 304d receives finger 283d when optical cable 280 is installed in 4-lane optical cable receptacle 300. First optical fibers or lenses 308a-308d are optically coupled to transmit optical fibers or lenses 284a-284d, respectively, and second optical fibers or lenses 310a-310d are optically coupled to receive optical fibers or lenses 286a-286d, respectively, when optical cable 280 is installed in 4-lane optical cable receptacle 300.

P and L signal detect pins receptacle 314a extends between bay-1 304a and bay-2 304b. P and L signal detect pins receptacle 314a receives P and L signal detect pins 292a of 4-lane optical cable 280 when optical cable 280 is installed in 4-lane optical cable receptacle 300. P and L signal detect pins receptacle 314a receives P and L signal detect pins 252 of 2-lane optical cable 240 when optical cable 240 is installed in the upper bays of 4-lane optical cable receptacle 300. P and L signal detect pins receptacle 314a includes contacts to electrically contact P and L signal detect pins 292a when 4-lane optical cable 280 is installed or P and L signal detect pins 252 when 2-lane optical cable 240 is installed.

P and L signal detect pins receptacle 314b extends between bay-3 304c and bay-4 304d. P and L signal detect pins receptacle 314b receives P and L signal detect pins 292b of 4-lane optical cable 280 when optical cable 280 is installed in 4-lane optical cable receptacle 300. P and L signal detect pins receptacle 314b receives P and L signal detect pins 252 of 2-lane optical cable 240 when optical cable 240 is installed in the lower bays of 4-lane optical cable receptacle 300. P and L signal detect pins receptacle 314b includes contacts to electrically contact P and L signal detect pins 292b when 4-lane optical cable 280 is installed or P and L signal detect pins 252 when 2-lane optical cable 240 is installed.

Figure 5A:
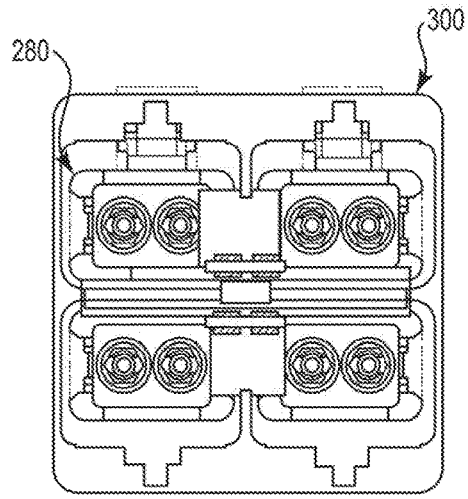
FIGS. 5A-5F illustrate examples of 4-lane, 2-lane, and 1-lane optical cables installed in 4-lane, 2-lane, and 1-lane optical cable receptacles.
Figure 5B:
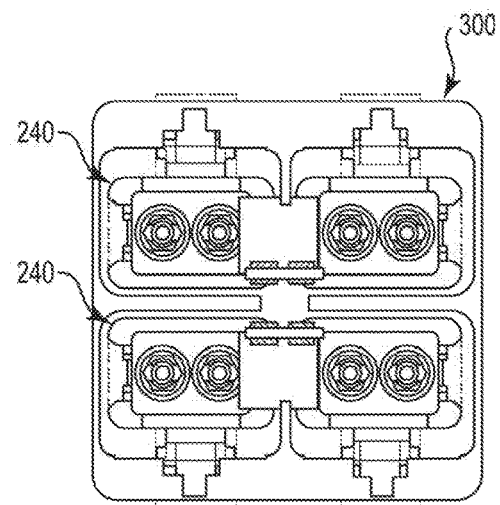

FIGS. 5A-5F illustrate examples of 4-lane, 2-lane, and 1-lane optical cables installed in 4-lane, 2-lane, and 1-lane optical cable receptacles. FIG. 5A illustrates a 4-lane optical cable 280 installed in a 4-lane optical cable receptacle 300. FIG. 5B illustrates two 2-lane optical cables 240 installed in a 4-lane optical cable receptacle 300. A first 2-lane optical cable 240 is installed in the upper two bays, and a second 2-lane optical cable 240 is installed in the lower two bays. The second 2-lane optical cable 240 installed in the lower two bays is flipped 180 degrees with respect to the first 2-lane optical cable 240 installed in the upper two bays.

Figure 5C:
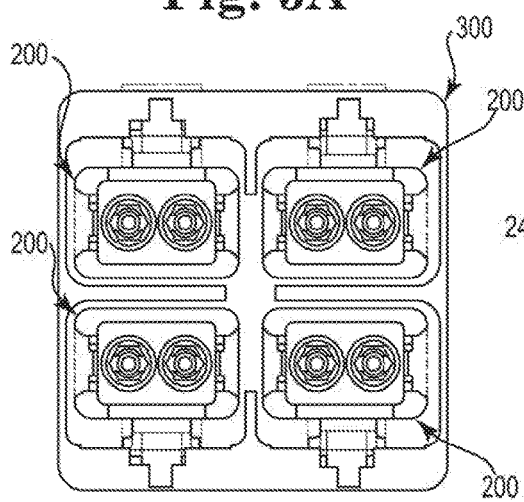

FIG. 5C illustrates four 1-lane optical cables 200 installed in a 4-lane optical cable receptacle 300. A first 1-lane optical cable 200 is installed in the upper right bay, a second 1-lane optical cable 200 is installed in the upper left bay, a third 1-lane optical cable 200 is installed in the lower left bay, and a fourth 1-lane optical cable 200 is installed in the lower right bay. The third and fourth 1-lane optical cables 200 installed in the lower two bays are flipped 180 degrees with respect to the first and second 1-lane optical cables 200 installed in the upper two bays.

Figure 5D:
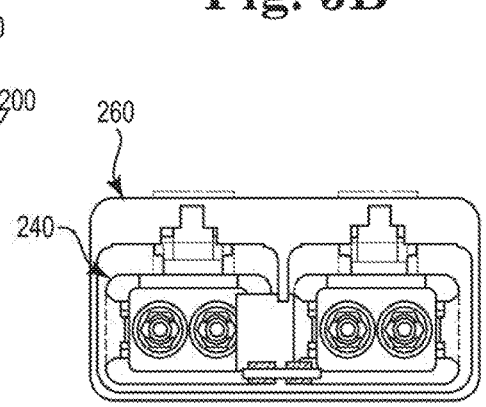
Figure 5E:
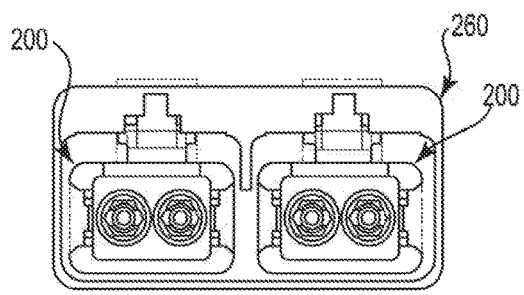
Figure 5F:
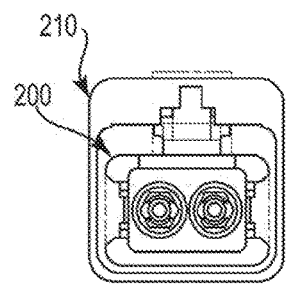

FIG. 5D illustrates a 2-lane optical cable 240 installed in a 2-lane optical cable receptacle 260. FIG. 5E illustrates two 1-lane optical cables 200 installed in a 2-lane optical cable receptacle 260. A first 1-lane optical cable 200 is installed in the right bay, and a second 1-lane optical cable 200 is installed in the left bay. FIG. 5F illustrates a 1-lane optical cable 200 installed in a 1-lane optical cable receptacle 210. Accordingly, a 1-lane optical cable may be installed in a 4-lane, 2-lane, or 1-lane optical cable receptacle, a 2-lane optical cable may be installed in a 4-lane or 2-lane optical cable receptacle, and a 4-lane optical cable may be installed in a 4-lane optical cable receptacle.

FIG. 6 illustrates one example of P and L signal detect pins 252 for a 2-lane optical cable connector. A cross-sectional view of P and L signal detect pins 252 is illustrated at 400, a top view is illustrated at 402, and a bottom view is illustrated at 404. P and L signal detect pins 252 include P signal pins 410a and 410b on the top surface of a board 401 (e.g. a PCB) and L signal pins 414a and 414b on the bottom surface of board 401.

P signal detect pins 410a and 410b are electrically coupled to each other as indicated at 412 to indicate that the optical cable is present (i.e., P=true). Thus, a signal applied by a system to one of P signal detect pins 410a and 410b will be returned to the system via the other one of P signal detect pins 410a and 410b to indicate that the optical cable is present. L signal detect pins 414a and 414b are electrically coupled to each other as indicated at 416 to indicate that the low-lane (i.e., lane-0) is present (i.e., L=true). Thus, a signal applied by a system to one of L signal detect pins 414a and 414b will be returned to the system via the other one of L signal detect pins 414a and 414b to indicate that the low-lane is present. Accordingly, when a 2-lane optical cable having P and L signal detect pins 252 is installed in an optical cable receptacle, the system can recognize that the cable is a 2-lane optical cable and can configure the network chip to provide a 2-lane port for the 2-lane optical cable.

FIG. 7 illustrates one example of P and L signal detect pins 292a and 292b for a 4-lane optical cable connector. A cross-sectional view of P and L signal detect pins 292a is illustrated at 420, a top view is illustrated at 422, and a bottom view is illustrated at 424. P and L signal detect pins 292a include P signal pins 430a and 430b on the top surface of a board 421 (e.g., a PCB) and L signal pins 434a and 434b on the bottom surface of board 421. A cross-sectional view of P and L signal detect pins 292b is illustrated at 440, a top view is illustrated at 442, and a bottom view is illustrated at 444. P and L signal detect pins 292b include P signal pins 450a and 450b on the top surface of a board 441 (e.g. a PCB) and L signal pins 454a and 454b on the bottom surface of board 441.

P signal detect pins 430a and 430b are electrically coupled to each other as indicated at 432 to indicate that the optical cable is present (i.e., P=true) in the upper bays. Thus, a signal applied by a system to one of P signal detect pins 430a and 430b will be returned to the system via the other one of P signal detect pins 430a and 430b to indicate that the optical cable is present in the upper bays. L signal detect pins 434a and 434b are electrically coupled to each other as indicated at 436 to indicate that the low-lane (i.e., lane-0) is present (i.e., L=true) in the upper bays. Thus, a signal applied by a system to one of L signal detect pins 434a and 434b will be returned to the system via the other one of L signal detect pins 434a and 434b to indicate that the low-lane is present.

P signal detect pins 450a and 450b are electrically coupled to each other as indicated at 452 to indicate that the optical cable is present (i.e., P=true) in the lower bays. Thus, a signal applied by a system to one of P signal detect pins 450a and 450b will be returned to the system via the other one of P signal detect pins 450a and 450b to indicate that the optical cable is present in the lower bays. L signal detect pins 454a and 454b are electrically isolated from each to indicate that the low-lane (I.e., lane-0) is not present (i.e., L=false) in the lower bays. Thus, a signal applied by a system to one of L signal detect pins 454a and 454b will not be returned to the system via the other one of L signal detect pins 454a and 454b to indicate that the low-lane is not present. Accordingly, when a 4-lane optical cable having detect pins 292a and 292b is installed in an optical cable receptacle, the system can recognize that the cable is a 4-lane optical cable and can configure the network chip to provide a 4-lane port for the 4-lane optical cable.

In this example, a 1-lane optical cable does not include P and L signal detect pins. Therefore, the detected P and L signals for the 1-lane optical cable are both false when the 1-lane optical cable is installed in an optical cable receptacle. Accordingly, when a 1-lane optical cable is installed in an optical cable receptacle, the system can recognize that the cable is a 1-lane optical cable and can configure the network chip to provide a 1-lane port for the 1-lane optical cable.

FIG. 8A illustrates a side view of one example of an uninstalled 4-lane optical cable 280 and FIG. 8B illustrates a side view of one example of an installed 4-lane optical cable 280. Optical cable 280 includes P and L signal detect pins 292a and 292b as previously described and illustrated with reference to FIG. 7. A 4-lane optical cable receptacle 300 as previously described and illustrated with reference to FIG. 4B includes P and L signal detect pins receptacles 314a and 314b.

Contacts within P and L detect pins receptacle 314a are electrically coupled to P and L signal detect pins 292a and contacts within P and L detect pins receptacle 314b are electrically coupled to P and L signal detect pins 292b when optical cable 280 is installed in receptacle 300 as illustrated in FIG. 8B. The contacts of P and L signal detect pins receptacles 314a and 314b are electrically coupled to a system management controller (not shown), which configures the network chip based on the detected P and L signals to provide the appropriate ports. In addition, a system-side optical jumper 480 is optically coupled to each lane of optical cable 280 when the optical cable is installed in receptacle 300 as illustrated in FIG. 8B.

Figure 9A:
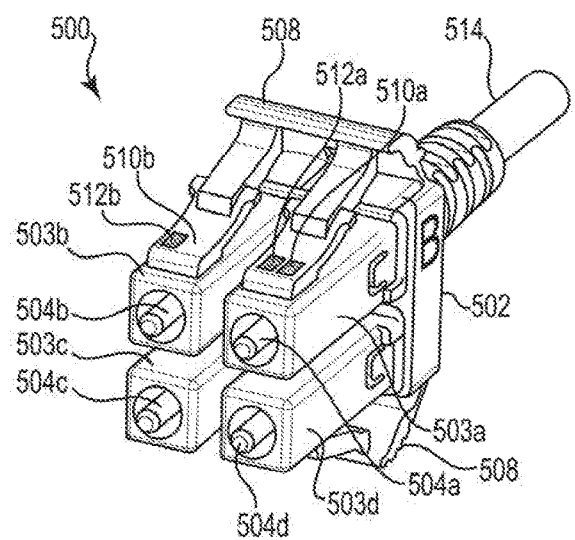
FIGS. 9A-9C illustrate examples of 4-lane, 2-lane, and 1-lane optical cables having P and L signal detect contact locations.

FIGS. 9A-9O illustrate examples of 4-lane, 2-lane, and 1-lane optical cables having P and L signal detect contact locations. FIG. 9A illustrates one example of a 4-lane optical cable 500. Optical cable 500 includes a housing 502 providing a cable connector, a cable cord 514, latches 508, transmit and receive optical fibers 504a-504d, and P and L signal detect contact locations. While L signal detect contact locations 510a and 510b and P signal detect contact locations 512a and 512b are visible in FIG. 9A on the upper surface of housing 502, similar P and L signal detect contact locations are also on the lower surface of housing 502. One latch 508 is attached to the top of housing 502 and another latch 508 is attached to the bottom of housing 502. Each latch 508 includes two levers that are linked to each other such that one motion will actuate both levers. Latches 508 ensure positive retention of optical cable 500 in an optical cable receptacle when the cable is installed, and allow easy removal of the optical cable from the optical cable receptacle.

Housing 502 defines a lane-0 connector finger 503a, a lane-1 connector finger 503b, a lane-3 connector finger 503c, and a lane-4 connector finger 503d. Lane-0 connector finger 503a includes transmit and receive optical fibers 504a for transmitting and receiving lane-0 optical signals across the optical cable. Lane-1 connector finger 503b includes transmit and receive optical fibers 504b for transmitting and receiving lane-1 optical signals across the optical cable. Lane-3 connector finger 503c includes transmit and receive optical fibers 504c for transmitting and receiving lane-3 optical signals across the optical cable. Lane-4 connector finger 503d includes transmit and receive optical fibers 504d for transmitting and receiving lane-4 optical signals across the optical cable.

Lane-0 finger 503a includes an L signal detect contact at location 510a and a P signal detect contact at location 512a. Lane-1 finger 503b does not include an L signal detect contact at location 510b and includes a P signal detect contact at location 512b. Likewise, lane-2 finger 503c and lane-4 finger 503d each include a P signal detect contact but do not include an L signal detect contact (not visible in FIG. 9A). The presence or absence of L signal and P signal detect contacts is used to identify to a system in which optical cable 500 is installed that optical cable 500 is a 4-lane optical cable as will be described in further detail below with reference to FIGS. 10 and 11.

Figure 9B:
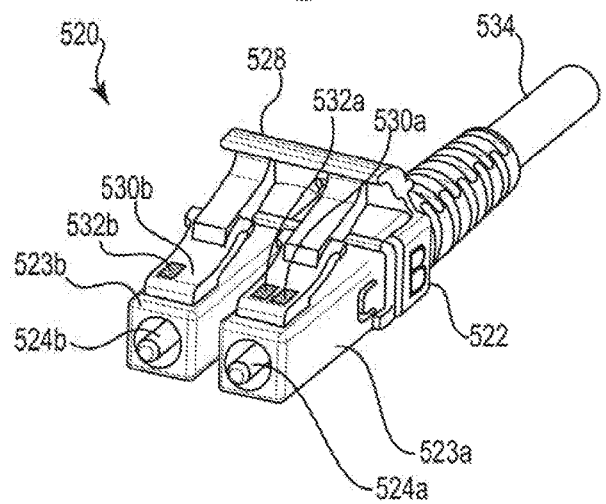

FIG. 9B illustrates one example of a 2-lane optical cable 520. Optical cable 520 includes a housing 522 providing a cable connector, a cable cord 534, a latch 528, transmit and receive optical fibers 524a and 524b, L signal detect contact locations 530a and 530b, and P signal detect contact locations 532a and 532b. Latch 528 is attached to housing 522 and includes two levers that are linked to each other such that one motion will actuate both levers. Latch 528 ensures positive retention of optical cable 520 in an optical cable receptacle when the cable is installed, and allows easy removal of the optical cable from the optical cable receptacle.

Housing 522 defines a lane-0 connector finger 523a and a lane-1 connector finger 523b. Lane-0 connector finger 523a includes transmit and receive optical fibers 524a for transmitting and receiving lane-0 optical signals across the optical cable. Lane-1 connector finger 523b includes transmit and receive optical fibers 524b for transmitting and receiving lane-1 optical signals across the optical cable.

Lane-0 finger 523a includes an L signal detect contact at location 530a and a P signal detect contact at location 532a. Lane-1 finger 523b does not include an L signal detect contact at location 530b and includes a P signal detect contact at location 532b. The presence or absence of L signal and P signal detect contacts is used to identify to a system in which optical cable 520 is installed that optical cable 520 is a 2-lane optical cable.

Figure 9C:
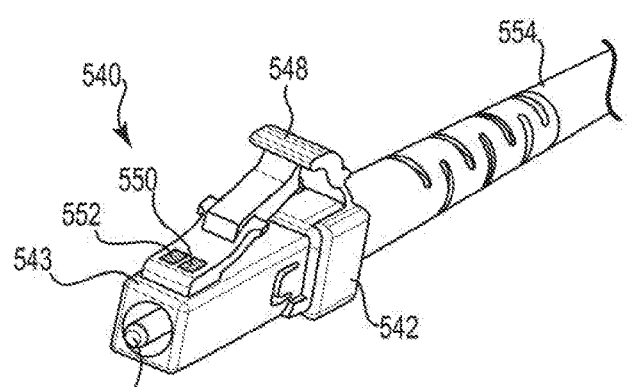

FIG. 9C illustrates one example of a 1-lane optical cable 540. Optical cable 540 includes a housing 542 providing a cable connector, a cable cord 554, a latch 548, transmit and receive optical fibers 544, an L signal detect contact location 550, and a P signal detect contact location 552. Latch 548 is attached to housing 542. Latch 548 ensures positive retention of optical cable 540 in an optical cable receptacle when the cable is installed, and allows easy removal of the optical cable from the optical cable receptacle.

Housing 542 defines a lane-0 connector finger 543. Lane-0 connector finger 543 includes transmit and receive optical fibers 544 for transmitting and receiving lane-0 optical signals across the optical cable. Lane-0 finger 543 includes an L signal detect contact at location 550 and a P signal detect contact at location 552. The presence of the L signal and P signal detect contacts is used to identify to a system in which optical cable 540 is installed that optical cable 540 is a 1-lane optical cable.

Figure 10:
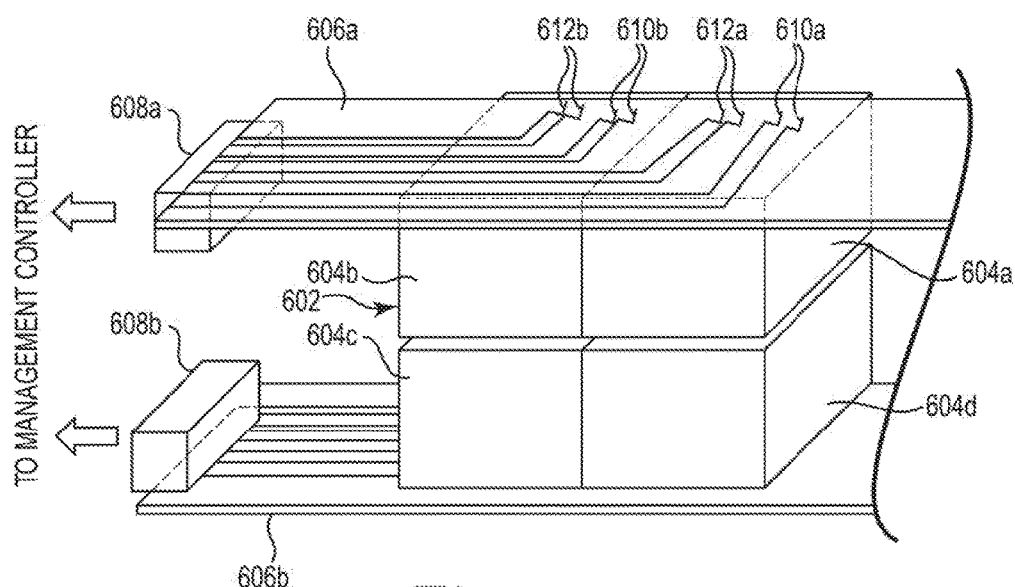
FIG. 10 illustrates one example of a 4-lane optical cable receptacle with P and L signal detect boards.

FIG. 10 illustrates one example of a 4-lane optical cable receptacle 602 with P and L signal detect boards 606a and 606b. Optical cable receptacle 602 with receptacle detect boards 606a and 606b may be used with a 4-lane optical cable 500 (FIG. 9A), two 2-lane optical cables 520 (FIG. 9B), or four 1-lane optical cables 540 (FIG. 9C). Optical cable receptacle 602 includes a first bay 604a (i.e., bay-1), a second bay 604b (i.e., bay-2), a third bay 6040 (i.e., bay-3), and a fourth bay 604d (i.e., bay-4). Bay-1 604a receives finger 503a, bay-2 604b receives finger 503b, bay-3 604c receives flinger 503c, and bay-4 604d receives finger 503d when 4-lane optical cable 500 is installed in 4-lane optical cable receptacle 602.

P and L signal detect board 606a includes contacts 610a-610b for detecting L signal detect contacts of optical cables and contacts 612a-612b for detecting P signal detect contacts of optical cables installed in bay-1 604a and bay-2 604b. Each contact 610a-610b and 612a-612b of P and L signal detect board 606a is electrically coupled to a connector 608a, which is electrically coupled to a management controller. Likewise, P and L signal detect board 606b includes contacts for detecting L signal detect contacts of optical cables and contacts for detecting P signal detect contacts of optical cables installed in bay-3 604c and bay-4 604d (not visible in FIG. 10). Each contact of P and L signal detect board 606b is electrically coupled to a connector 608b, which is electrically coupled to the management controller.

Figure 11:
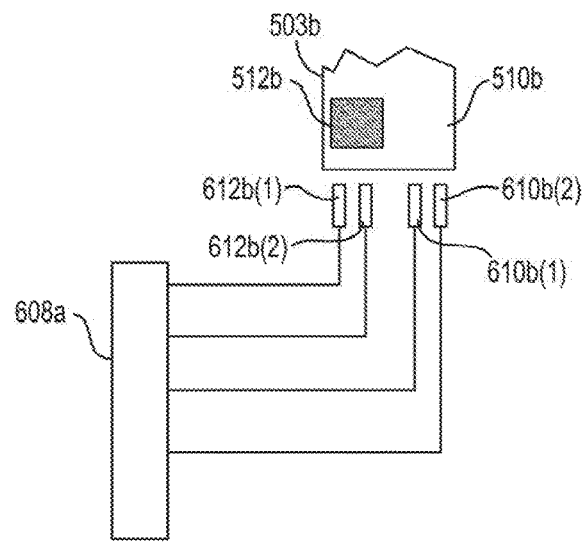
FIG. 11 illustrates one example of P and L signal contacts of a P and L signal detect board.

FIG. 11 illustrates one example of P and L signal contacts of P and L signal detect board 606a for bay-2 604b of optical cable receptacle 602. Also illustrated in FIG. 11 are L signal detect contact location 510b and P signal detect contact location 512b of finger 503b of optical cable 500. As previously described and illustrated with reference to FIG. 9A, finger 503b includes a P signal detect contact at location 512b and does not include an L signal detect contact at location 510b. Contacts 610b(1) and 610b(2) are for contacting location 510b and contacts 612b(1) and 612b(2) are for contacting location 512b when the optical cable is installed. With no L signal detect contact at location 510b, contacts 610b(1) and 610b(2) are electrically isolated from each other indicating to the management controller that an L signal detect contact is absent (i.e., L=false). With a P signal detect contact at location 512b, contacts 612b(1) and 612b(2) are electrically coupled to each other indicating to the management controller that a P signal detect contact is present (i.e., P=true).

Figure 12A:
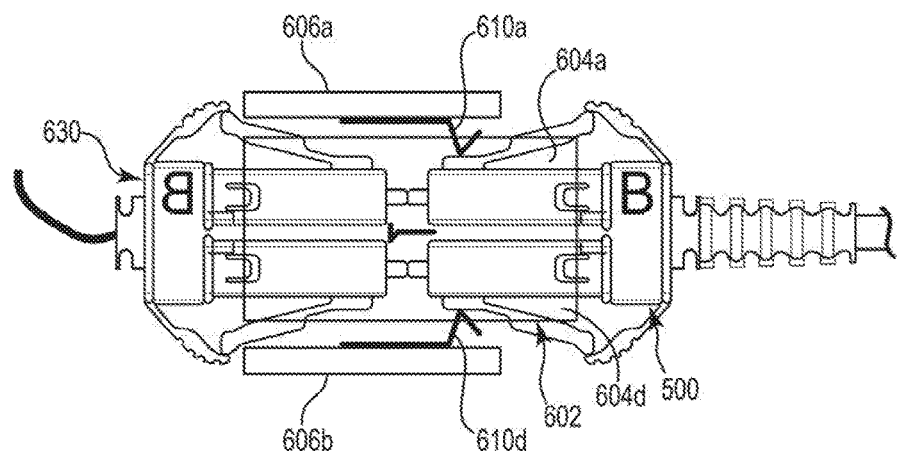
FIGS. 12A and 12B illustrate side views of examples of 4-lane and 1-lane optical cables installed in an optical cable receptacle including P and L signal detect boards.

FIGS. 12A and 128 illustrate side views of examples of 4-lane and 1-lane optical cables installed in an optical receptacle. FIG. 12A illustrates a side view of a 4-lane optical cable 500 installed in an optical cable receptacle 602. The P and L signal detect contact locations on optical cable 500 contact the contacts of P and L signal detect board 606a in the upper bays (e.g., 610a for the L signal contact of bay-1 604a is visible in FIG. 12A), and the P and L signal detect contact locations on optical cable 500 contact the contacts of P and L signal detect board 606b in the lower bays (e.g., 610d for the L signal contact of bay-4 604d is visible in FIG. 12A). System side optical cable 630 is optically coupled to optical cable 500.

Figure 12B:
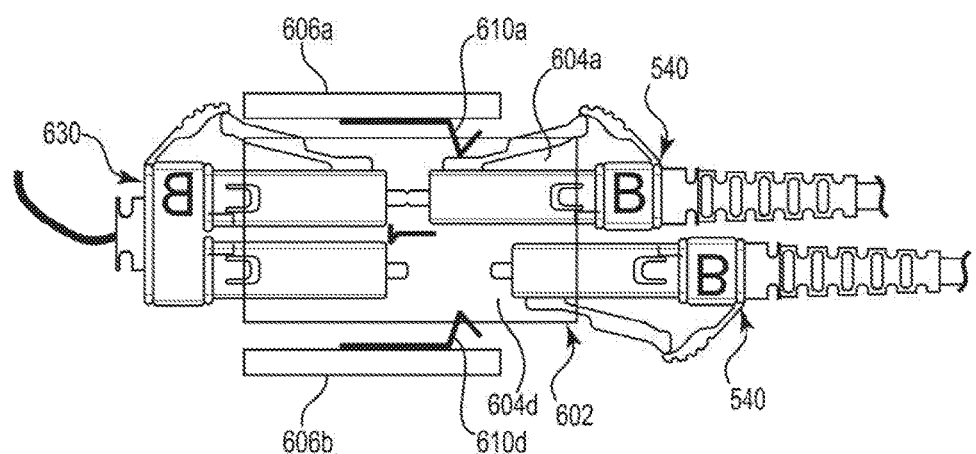

FIG. 12B illustrates a side view of a first 1-lane optical cable 540 installed in optical cable receptacle 602 and a second 1-lane optical cable 540 being installed in optical cable receptacle 602. The first optical cable 540 is installed in bay-1 604a, and the second optical cable 640 is being installed in bay-4 604d, The P signal detect contact location 552 and the L signal detect contact location 550 of the first optical cable 540 contact the contacts of P and L signal detect board 606a in bay-1 604a (e.g., 610a for the L signal contact of bay-1 604a is visible in FIG. 12B). The P signal detect contact location 552 and the L signal detect contact location 550 of the second optical cable 540 will contact the contacts of P and L signal detect board 606b in bay-4 604d (e.g., 610d for the L signal contact of bay-4 604d is visible in FIG. 12B) once the cable is installed. System side optical cable 630 is optically coupled to optical cables 540 when optical cables 540 are installed.

Figure 13:
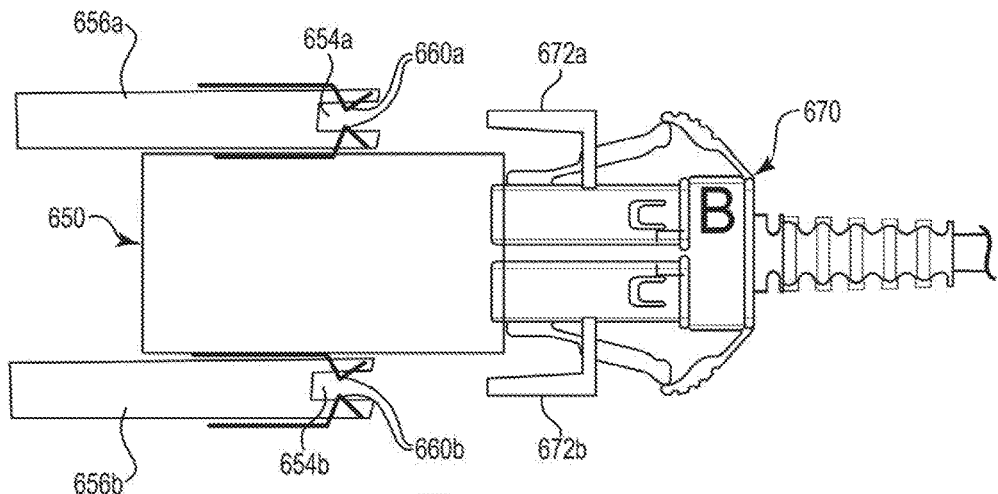
FIG. 13 illustrates a side view of one example of a 4-lane optical cable being installed in an optical cable receptacle including P and L signal detect boards.

FIG. 13 illustrates a side view of one example of a 4-lane optical cable 670 being installed in an optical cable receptacle 650 including P and L signal detect boards 656a and 656b. Each finger of optical cable 670 include a P and L signal detect contact arm as indicated for example at 672a and 672b for two fingers of the cable. Each P and L signal contact arm 672a and 672b includes P and L signal detect contact locations (not shown). In one example, one of the L and P signal detect contact locations is on the upper surface of each arm 672a and 672b, and the other one of the L and P signal detect contact locations is on the lower surface of each arm 672a and 672b.

A first P and L signal detect board 656a is attached to the upper surface of receptacle 650, and a second P and L signal detect board 656b is attached to the lower surface of receptacle 650. First P and L signal detect board 656a includes a receptacle portion 654a including contacts 660a for contacting P and L signal contact locations on P and L signal detect contact arm 672a when cable 670 is installed in receptacle 650 thereby inserting P and L signal detect contact arm 672a into receptacle portion 654a Second P and L signal detect board 656b includes a receptacle portion 654b including contacts 660b for contacting P and L signal detect contact locations on P and L signal detect contact arm 672b when cable 670 is installed in receptacle 650 thereby inserting P and L signal detect contact arm 672b into receptacle portion 654b.

Figure 14A:
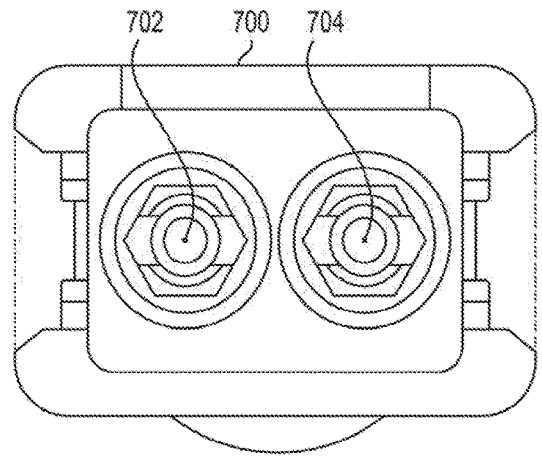
FIGS. 14A-14D illustrate examples of optical cable fingers for transmit and receive optical signals.
Figure 14B:
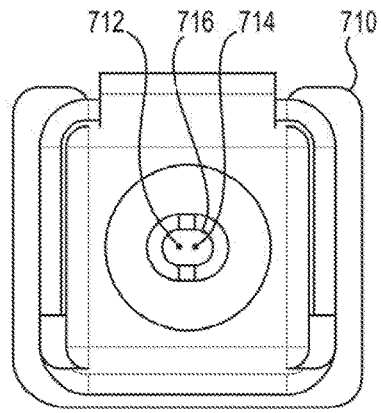
Figure 14C:
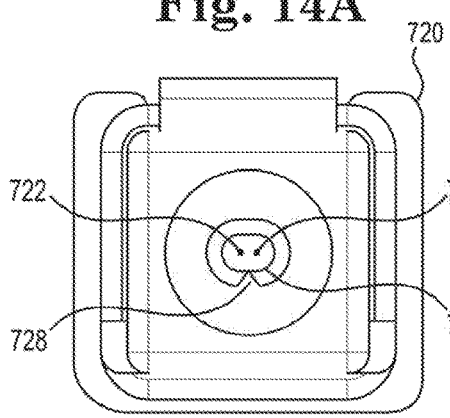
Figure 14D:
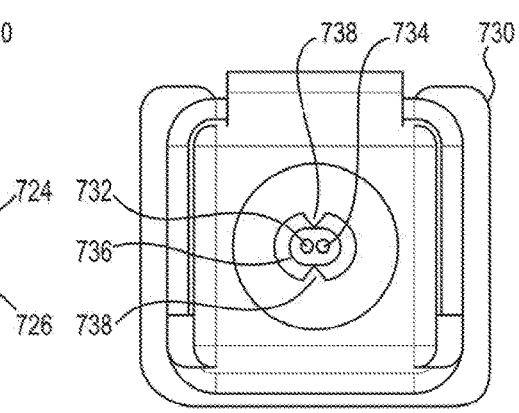

FIGS. 14A-140 illustrate examples of optical cable fingers for transmit and receive optical signals. FIG. 14A illustrates one example of an optical cable finger 700 including 1-fiber ferrules 702 and 704 for transmit and receive optical signals. In this example, rotational alignment for each 1-fiber ferrule 702 and 704 is not needed. FIG. 14B illustrates one example of an optical cable finger 710 including a 2-fiber Physical Contact (PC) ferrule including two optical fibers 712 and 714 in an oval shaped ferrule 716 for rotational alignment. FIG. 14C illustrates one example of an optical cable finger 720 including a 2-fiber PC ferrule including two optical fibers 722 and 724 in an oval shaped ferrule 726 and a notch 728 for alignment. FIG. 14D illustrates one example of an optical cable finger 730 including a 2-fiber lensed ferrule including two optical fibers in an oval shaped ferrule 736 and two notches 738 for alignment. The two optical fibers are optically coupled to lenses 732 and 734, respectively. Optical cable fingers 700, 710, 720, or 730 may be used for each of the 4-lane, 2-lane, and 1-lane optical cables previously described herein.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a network chip;
a system management controller; and
a receptacle comprising a plurality of bays, each bay including a plurality of optical fibers and supporting 1-lane for optical transmit and receive signals, and to connect to the network chip,
wherein: each bay of the receptacle comprises a latch area to receive a latch of an optical cable and comprises signal detect contacts positioned within the bay on a same side of the bay as the latch area,
wherein the network chip is configured by the system management controller, to view the receptacle as a multi-lane port when connected to a multi-lane optical cable, based on signal detect contacts of the multi-lane cable, and configured to view the receptacle as a plurality of 1-lane ports when connected to a plurality of 1-lane optical cables, based on signal detect contacts of the multi-lane cable.

2. The system of claim 1, wherein the receptacle has four bays, and
wherein the receptacle is to connect to any one of four 1-lane optical cables to provide four 1-lane ports, two 2-lane optical cables to provide two 2-lane ports, and one 4-lane optical cable to provide one 4-lane port.

3. The system of claim 1, wherein the receptacle comprises a divider wall between adjacent bays.

4. A system comprising:
a network chip;
a system management controller; and
an optical cable receptacle connected to the network chip and having multiple bays, each bay including:
a plurality of optical fibers supporting 1-lane of network communications;
a latch area to receive a latch of an optical cable; and
present signal detect contacts and low-lane signal detect contacts within each bay of the optical cable receptacle to detect whether a multi-lane optical cable or a 1-lane optical cable is installed in the optical cable receptacle, wherein the present and low-lane signal detect contacts are positioned within each bay on a same side as the latch area of the bay, wherein the system management controller recognizes a type of optical able based on the present signal detect contacts and low-lane signal contacts of the optical cable, and wherein, based on recognition of cable type, the system management controller configures the network chip to view the optical cable receptacle as 1-lane ports or a multi-lane port.

5. The system of claim 4, wherein the optical cable receptacle comprises a divider wall between adjacent bays.

6. The system of claim 4, wherein the present signal detect contacts within the optical cable receptacle each comprise two contacts to detect whether a present signal detect contact is present or absent at a first signal detect contact location on an installed optical cable, and wherein the low-lane signal detect contacts within the optical cable receptacle each comprise two contacts to detect whether a low-lane signal detect contact is present or absent at a second signal detect contact location on an installed optical cable.

7. The system of claim 4, wherein the present signal detect contacts within the optical cable receptacle each comprise two contacts to detect whether two present signal detect pins are electrically coupled to each other or electrically isolated from each other on an installed optical cable, and wherein the low-lane signal detect contacts within the optical cable receptacle each comprise two contacts to detect whether two low-lane signal detect pins are electrically coupled to each other or electrically isolated from each other on an installed optical cable.

8. The system of claim 4, wherein the present and low-lane signal detect contacts within the optical cable receptacle is utilizable to identify a presence of a present signal and a low-lane signal of different lane-count optical cables such that different types of optical cables are identified based on a presence or an absence of a present signal and a low-lane signal.

9. The system of claim 4, wherein the present and low-lane signal detect contacts within the optical cable receptacle is utilizable to identify a quantity of optical cables connected to the optical cable receptacle based on a quantity of low-lane signals detected by the present and low-lane signal detect contacts.

10. A system comprising:

a first system comprising a system management controller and a network chip communicatively coupled to a first receptacle including a plurality of bays, each bay including a plurality of optical fibers and a latch area to receive a latch and supporting 1-lane of network communications, the first receptacle to connect to a multi-lane optical cable to provide a multi-lane port or connect to a plurality of 1-lane optical cables to provide a plurality of 1-lane ports, wherein: each bay comprises present and low-lane signal detect contacts positioned within the bay on a same side of the bay as the latch area to detect whether a multi-lane optical cable or a 1-lane optical cable is installed in the first receptacle and, based on the detection, the system management controller t configure the network chip to identify the receptacle as a multi-lane port, multi-lane ports, or 1-lane-ports;

a second system comprising a second receptacle to connect to an optical cable; and an optical cable communicatively coupling the first system to the second system via the first receptacle and the second receptacle.

11. The system of claim 10, wherein the first receptacle comprises four bays, wherein the second receptacle comprises two bays,
wherein the optical cable is a 2-lane optical cable, and
wherein the network chip provides a 2-lane port in response to the 2-lane optical cable.

12. The system of claim 10, wherein the first receptacle comprises four bays, wherein the second receptacle comprises one bay,
wherein the optical cable is a 1-lane optical cable, and
wherein the network chip provides a 1-lane port in response to the 1-lane optical cable.

13. The system of claim 10, wherein the optical cable comprises contacts identifying the optical cable to the first system as either a multi-lane optical cable or a 1-lane optical cable, and wherein the network chip is configured to provide a multi-lane port or a 1-lane port in response to the identification of the optical cable via the contacts.

14. The system of claim 10, wherein the first receptacle comprises a divider wall between adjacent bays.

15. The system of claim 8, wherein the present and low-lane signal detect contacts within the optical cable receptacle is to identify a 4-lane optical cable based on a presence of an individual low-lane signal and a presence of more than two present signals.

16. The system of claim 8, wherein the present and low-lane signal detect contacts within the optical cable receptacle is to identify a 2-lane optical cable based on a presence of an individual low-lane signal and a presence of more than one present signal.

17. The system of claim 8, wherein the present and low-lane signal detect contacts within the optical cable receptacle is to identify a 1-lane optical cable based on a presence of an individual low-lane signal and an individual present signal.

* * * * *